March 20, 1956 S. W. WOODARD 2,739,296
MARINE MARKER
Filed Nov. 27, 1948 3 Sheets-Sheet 1

INVENTOR.
STANLEY W. WOODARD
BY Lester B. Clark
+ Ray L. Smith
ATTYS

March 20, 1956  S. W. WOODARD  2,739,296
MARINE MARKER
Filed Nov. 27, 1948  3 Sheets-Sheet 2

INVENTOR.
STANLEY W. WOODARD.
BY Lester B. Clark
  Ray L. Smith
ATTYS.

March 20, 1956 S. W. WOODARD 2,739,296
MARINE MARKER
Filed Nov. 27, 1948 3 Sheets-Sheet 3

Inventor
STANLEY W. WOODARD
By Lester B. Clark
& Ray L. Smith
ATTYS.

United States Patent Office 2,739,296
Patented Mar. 20, 1956

2,739,296

MARINE MARKER

Stanley W. Woodard, Houston, Tex., assignor, by mesne assignments, to Marine Marker Corporation, Houston, Tex., a corporation of Texas Application November 27, 1948, Serial No. 62,365

2 Claims. (Cl. 340—3)

The invention relates to a marker and in particular to a submarine marker for repeatedly and accurately locating a predetermined point in a submerged area.

It is often necessary to return to a given point in a water covered area as where operations are to be carried out with sunken objects or where prospecting, drilling, or production is to be had from sub-surface geological structures. Unless such a point can be located from land positions, which is sometimes impossible and is often inconvenient, it is usually very difficult to determine accurately the location of the previously determined point.

Heretofore it has been common practice to mark the point with a buoy, but this is disadvantageous in that the buoy may become loosened from its anchor, destroyed by contact from moving objects. Furthermore, the anchor for the buoy may drag or shift along the bottom due to tide and current movements, and in such case, the buoy would not give a true indication of the predetermined point. The presence of the buoy also creates hazards to the fishing industry and to navigation generally.

Sometimes a tower is erected in the water to mark a selected point. This is expensive and time consuming, presents hazards to the fishing industry and to navigation comparable to those mentioned above.

An object of the present invention is to provide a marine marker of which its location can be readily ascertained and which avoids the above enumerated difficulties.

Another object of the invention is to provide a marine marker which is a self-contained automatic signalling device which can be positioned on a submerged surface to permit location thereof as a determined point.

The invention further relates to a marine marker which is particularly adapted for use in horizontal surveying over water covered areas.

With the advent of well drilling over water covered areas, such as marshes, bays, and gulfs, it is desirable to obtain advance information regarding the sub-surface formation, geology, and characteristics.

There are, of course, different modes of sub-surface prospecting, such as seismic, electrical, electro-magnetic, and gravity meter procedures for investigating the sub-surface conditions.

All of these procedures require some modification from the over land practice when they are to be utilized over water covered areas because of the fact that it is difficult to determine an exact base point for the survey or for the triangulation procedure where the earth's surface is submerged in the water.

It is an object to provide a marine marker which may be deposited on the earth's surface adjacent the area which is to be surveyed, where such marker is a self-contained unit capable of operation for long periods of time without being serviced, and so that such marker will transmit definite and identifiable signals to enable its relocation when submerged in the water.

It is also an object of the invention to provide a marine marker and signalling device which will permit sound measurements in the vicinity thereof.

Still another object of the invention is to provide a marine marker which will transmit a signal of a suitable type, such as sonic or ultrasonic, which is distinguishable from other adjacent and similar markers as to tone, sequence of signalling, or strength and type of signal.

A still further object of the invention is to provide a marker which transmits a signal, which due to its tone, sequence, strength, et cetera, will enable the operator to determine the proximate distance of observations from the marker because of the type of signal.

A still further object of the invention is to provide a marker which, because of the timing and intermittent use thereof, prolongs the life of the power source so that for instance the signal may operate for only a relatively short period of total signalling during any particular period.

A still further object of the invention is to provide a marker device to be submerged on a water covered area whereby the signal therefrom may be adjusted as to timing, tone, or strength; may be adjusted to obtain a signal pattern capable of use in horizontal over water surveying.

It goes without saying that in making a survey of a water covered area it is necessary to establish certain base points and other points of reference which may be readily located in order to tie-in the other data of the survey.

The relocation of such points or markers is also desirable when the operators are correlating the sub-surface prospecting data with the horizontal survey information.

Another object of the invention is to provide a marine marker which carries a source of electrical energy, a source of mechanical energy, and a mechanism whereby the electrical energy may be utilized to restore the mechanical energy, so as to transmit a periodic signal for a long period of time.

Still another object of the invention is to provide a mechanism for the rewinding of a spring driven clock at periodic intervals by connecting a rewinding device to an independent source of power.

Still another object of the invention is to provide a rewinding mechanism for a clock in a submerged marine marker so that a signal will be transmitted due to the operation of such clock for long periods of time.

Another object of the invention is to provide a spring driven clock rewinding device connected into a motor circuit so that the rewinding device will be actuated upon the expending of a predetermined amount of the mechanical energy of the clock spring and shut off when the spring has been wound, so that the clock may operate for long periods of time without being serviced.

Other and further objects of the invention will be readily apparent when the following description is considered in connection with the accompanying drawings, wherein.

Figures 1, 2:
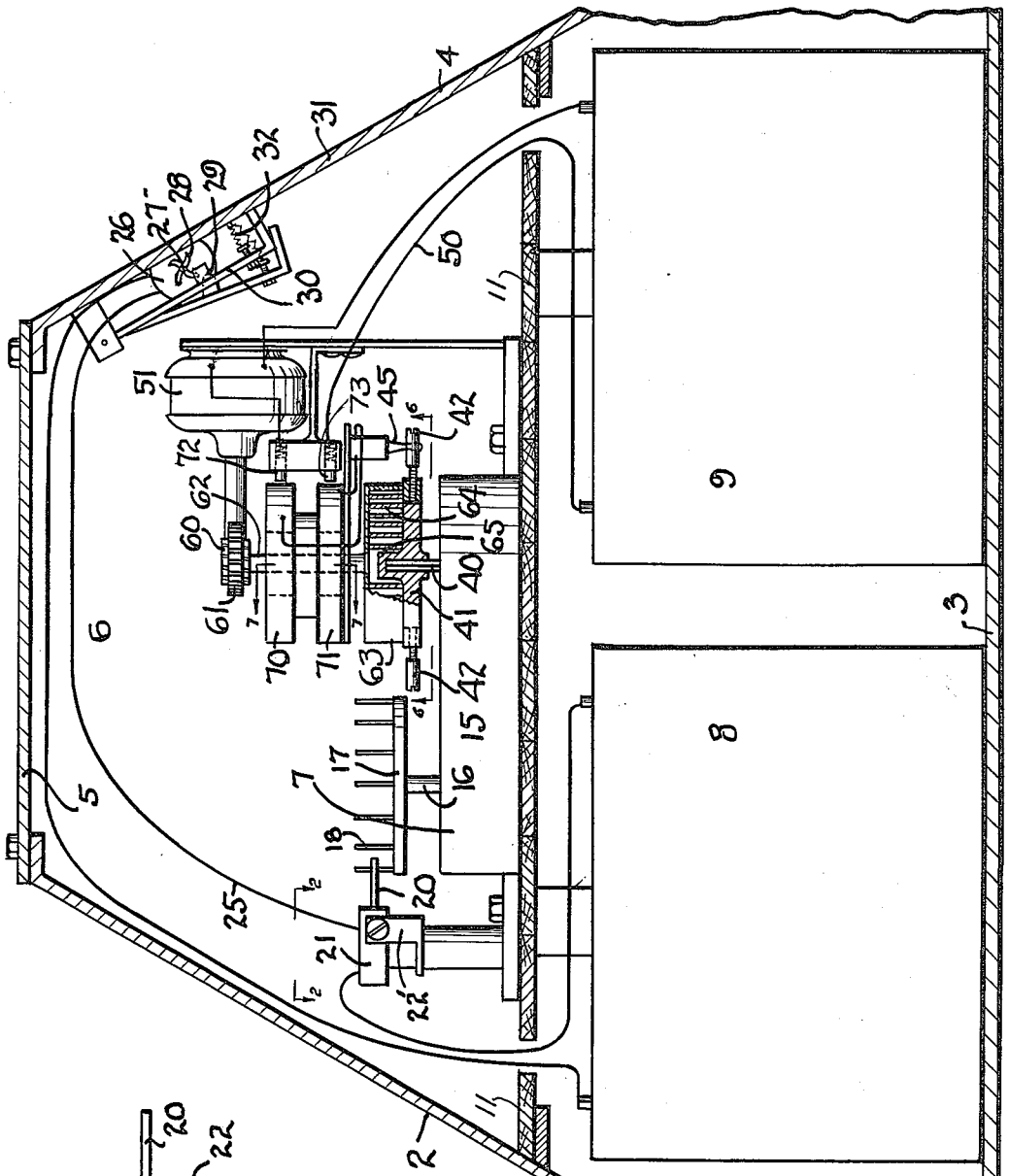
Fig. 1 is a transverse sectional view of the marine marker housing and illustrating the arrangement of the mechanism.
Fig. 2 is a sectional view illustrating the timing switch as seen on the line 2—2 of Fig. 1.
Figure 3:
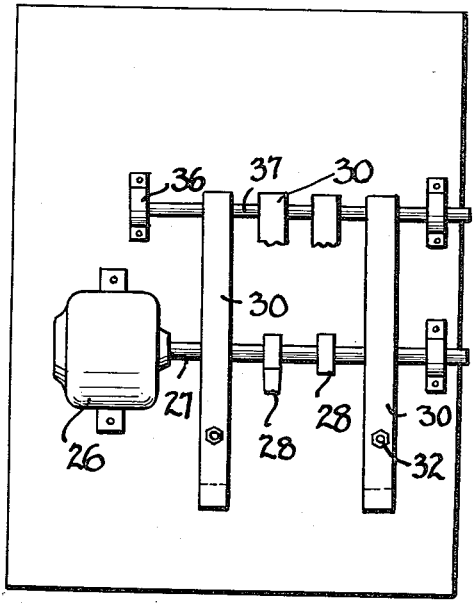
Fig. 3 is a view looking at the striker mechanism in the upper right hand corner of Fig. 1.
Figure 6:
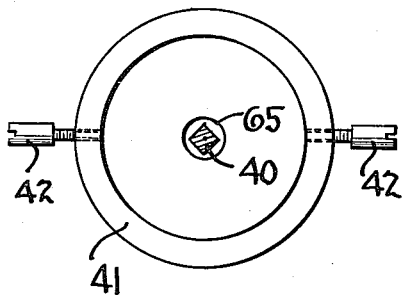
Fig. 6 is a section taken on the line 6—6 of Fig. 1 looking upwardly at the rewinding control member.
Figure 4:
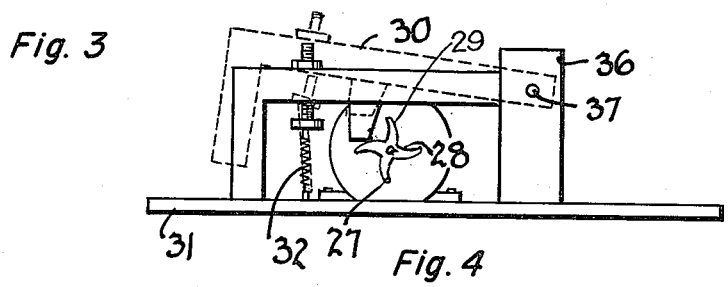
Fig. 4 is an enlarged end elevation of the striker mechanism.
Figure 5:
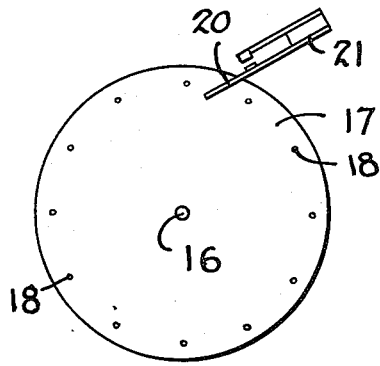
Fig. 5 is a plan view looking down on the timing mechanism of Fig. 1.
Figure 7:
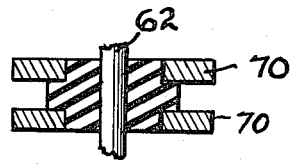
Fig. 7 is a vertical sectional view through the slip ring construction and taken on the line 7—7 of Fig. 1.

The signalling device is embodied in the form shown in Fig. 1 wherein the housing 2 has a base 3 which is arranged to rest upon the bottom or upon the earth's surface. The housing 2 may be deposited in any desired manner so that it will be submerged and remain in position to serve as a point for various operations.

The housing 2 is generally of a truncated pyramid form with the sloping sides 4 so that nets and cables will slide over the marker and thus minimize its obstruction to navigation.

The housing has a removable cover plate 5 which may be suitably affixed in order to provide a water tight interior 6 in which the mechanism 7 and the batteries 8 and 9 will be deposited.

The batteries 8 and 9 are disposed in the lower portion of the housing and are surmounted by the floor or partition 11 which supports the mechanism 7. The partition 11 is made up of separate pieces or boards so that they may be removed through the top of the housing.

The partition serves as a support for the spring motor 15. Such clocks are readily available on the market and are arranged so that a shaft 16 projecting therefrom may have a disc 17 deposited thereon in such manner that the upstanding pins 18 spaced on the periphery of the disc 17 will be caused to engage the switch arm 20 as the clock operates on a predetermined schedule at a known and constant rate of speed. Any suitable timing device may be used to replace the clock.

The switch arm 20 is affixed on the switch 21, thus seen in Fig. 2 where the switch is pivoted on an upright stud which carries a bracket. The arm is normally held in retracted position by a spring 22, and its position may be adjusted by the set screw 23 through the support bracket 22'. When one of the pins 18 engages the arm 20 it will move the switch to closed position, which closes the circuit 25 between the battery 8 and the striker actuating motor 26. The switch 20 remains closed for but a short period of time, so as to minimize the current drawn from the battery 8.

The motor 26 has the shaft 27 projecting therefrom which is arranged with a plurality of cam faces 28. These faces will move against a projection 29 carried by the striker arm 30, which is normally held in engagement with the sounding portion 31 of the housing by a spring 32. As the cam 28 passes beyond the projection 29 the spring 32 will snap the striker arm back against the sound portion 31 of the housing to transmit an audible signal. It seems obvious that by arranging cams of different configuration and spacing, and arms of different types, that the tone and sequence of the signal may be adjusted. By providing different springs 32, or adjusting these springs to a different tension, variations in the operation of the different strikers may be obtained to give dfferent intensity of the signals.

It seems obvious that any desired number of arms or any different combination of signals may be readily devised.

Particular attention is directed to the fact that the signals will be transmitted for but a very short period of time in order to minimize the current use from the battery 8. This minimum amount of signalling is also of advantage because the transmitted signal will not therefore interfere with any other sound operations or with other surveys which are being conducted in the vicinity. The pins 18 may be readily adjusted so as to give the desired sequence or pattern of signal desired.

It is intended that the device will be in the form of a self-contained unit which can be submerged and will operate for long periods of time. The clock 15 may of course be of a size to operate for a substantial period; but on the other hand it is desirable that the clock or the mechanical energy thereof be restored from time to time. In other words, it is desirable to rewind the clock without retrieving the signalling device or marker from its submerged position.

This rewinding mechanism is best seen in Fig. 1, wherein a square shaft 40 projects upwardly from the clock 15. Removably disposed on the shaft 40 is the control plate 41 which has a non-circular opening to fit the shaft 40, and this plate is provided with adjustably extending pins 42. Any desired number and circumferential spacing of these pins may be provided.

Projecting between the pins 42 is a control switch 45 which is disposed in a circuit 50 including the battery 9 and the motor 51.

The purpose of the switch 45 is to control the rewinding of the spring motor. When the clock 15 has run for a predetermined period the plate 41 will have turned through a portion of a circle so that one of the pins 42 will engage the switch 45. This closing of the switch closes the circuit 50 so that the motor 51 will start operation to turn the rewinding mechanism, including the plate 41 and the shaft 40. When the clock has been rewound to a predetermined extent one of the other arms 42 will engage the switch 45 to open the circuit. In other words, an automatic rewinding mechanism has been provided.

In order to transmit the power of the motor 51 to the clock shaft 40 a worm 60 on the motor engages a pinion 61 on the rewinding shaft 62. This rewinding shaft forms a portion of an inverted cup 63 disposed over the top of the plate 41. A coil spring 64 in the cup 63 has one end anchored to the cup and one end anchored to the upstanding projection 65 on the plate 41. In this manner a resilient driving connection is provided between the motor and the clock shaft 40.

The rewinding shaft 62 has the slip rings 70 and 71 mounted thereon, and these slip rings have the contacts 72 and 73 of the clock engaging the slip rings 70 and 71 respectively. These contacts constitute a part of the circuit 50. The switch 45 is connected across the rings 70 and 71 and rotates with them.

The operation of the rewinding mechanism is as follows:

Starting with the position where the clock has been wound and is now operating to turn the plate 17 and the pins 18, as the clock spring runs down. At the beginning of this unwinding or running down of the clock, there is a balance between the clock spring and the rewinding spring 64. The motor 51 was caused to shut off to cease the rewinding mechanism because the torque applied to the extension 65 between cup 63 and the spring 64 was insufficient to turn the plate 41 against the resistance of the clock spring to any great extent. One of the pins 42 under these circumstances engages the switch arm 45 to shut off the motor. The adustment of the pins 42 governs the time at which the motor 51 will shut off and consequently the amount of rewinding applied to the clock spring.

The torque in the spring 64 is applied constantly against the rewinding shaft 40 of the clock. As the clock unwinds it reduces the resistance to turning of the shaft 40, and because the spring 64 is applying a continuous torque always equal to or greater than the torque of the clock spring, the spring 64 will tend to turn the plate 41 and pins 42 in a manner comparable with the running down of the clock 15. When the clock has sufficiently run down that the torque in the spring 64 is thus enabled to turn the plate 41 and pins 42, one of the pins 42 will again strike the switch arm 45 moving it to the opposite or closed position to close the circuit to the motor 51.

When the operation of the motor 51 begins, since the clock spring is in its unwound state, the resistance to the winding of the clock is small at first, but as the winding continues and the clock spring is further wound then it offers continuously increasing resistance to winding, and whereupon the resistance causes spring 64 to start winding. This relative movement causes the switch 45 to move ahead of the pin 42. As the winding continues, the switch continues to move ahead of the plate 41. As the clock spring resistance increases the spring 64 winds up to some extent so that the pins 42 and plate 41 lag with respect to the switch 45. Thus the switch 45 carried by the cup 63 moves into engagement with a pin 42 to shut off the switch and thus the motor 51. The cycle of unwinding and rewinding and the turning on and shutting off of the switch 45 is thus a continuous automatic arrangement.

It is apparent from the foregoing that a continuous and automatic operation of the winding and signalling mechanism is conducted over long periods of time with the use of but a small amount of current, the motor 51 being operated by the battery 9, while motor 26 is operated by the battery 8, as controlled by pins 18 and switch arm 20.

From the foregoing it is apparent that the rewinding mechanism will be automatically actuated to rewind the clock at periodic intervals. This arrangement is to advantage because it is only for a relatively short period that power is drawn from the battery 9.

It seems apparent that at the time the marker is deposited it can be adusted so as to predetermine the sequence and strength of the signal by providing different cams of different configuration and springs 32 of different strength or adjustment, a considerable variety of signals may be arranged. The signal will be transmitted through the water to be detected by the operators through the use of suitable hydrophones which are available on the market, and it seems obvious that a signal may be dispatched which can be readily detected so as to identify the marker.

With the arrangement provided the batteries 8 and 9 will furnish sufficient power to operate the marker for long periods of time, because the signal may be arranged to be transmitted for but a few seconds out of each minute or hour of the day. The signal may be arranged so that it will not interfere with any other sound surveying operation. The signal will not vary or fade due to weakness of the battery, and the signal of constant magnitude or intensity will be provided. The signals may be readily coded.

A plurality of the strikers 30 may be arranged or the pattern of the signal predetermined, so that certain signals will be identifiable at one distance while another signal will be identifiable at an entirely different distance. Thus, one signal may indicate that the observer is in the general vicinity of the marker, while another signal may indicate close proximity to the marker.

While mechanically operable strikers have been shown and described, it seems very obvious that the energy from the operation of the strikers could be very readily connected to execute the transmission of an electrical, radio, electromagnetic, or audio wave signal. In some instances combination audio and radio transmitters could be provided.

While mechanically operable strikers have been shown and described, it seems obvious that the energy could be employed to operate other suitable and known types of signalling devices. For example, either direct or alternating current could be passed between two electrodes spaced an appreciable distance apart in the water adacent the marker housing and which electrodes are connected to the power source within the marker by means of suitable cables passing through the housing.

The electrical field set up by this current could be detected by means of suitable electrodes in contact with the water at the surface, boat, or control point, and which are connected to suitable apparatus for detecting potential difference, such as a potentiometer.

The power source could also be used to pass alternating current through an induction coil laying in the water outside the marker but which is connected to the power source through a suitable alternating current generator within the marker by means of suitable cable or cables passing through the housing. The electromagnetic field set up in this manner could be detected by means of a suitable search coil which is in the vicinity of the marker and which is attached to suitable apparatus for detecting such fields, such as an electronic amplifier.

Again, the power could be used to operate a radio transmitter which would be used to send a radio-frequency electromagnetic field through the water.

Perhaps the most important substitution of another type signaling device in place of the strikers would be another type of sound transmitter. There are various types of under water sound transmitters which are well known and which could be used to replace the strikers. Such transmitters could be used to produce signals of any desired frequency or combination of frequencies which could range from low sonic frequencies to high ultrasonic frequencies. As an example, one type of under water sound transmitter which could be used is the Fessenden oscillator, which is illustrated in Patent 1,610,779 issued to J. R. Hewett. The diaphragm of the oscillator could be mounted in the top of the housing or in one of the sides, whichever were more convenient. In this particular case the signal transmitted might be a single fixed predetermined frequency. Such frequency could be different from different markers as a means of identifying one marker from another.

It is intended that the marker and housing shall incorporate sufficient weight to give stability to the marker so that it will not readily shift its position but which can be conveniently handled, and can be removed from the water bottom when desired.

The intermittent signal of course serves to minimize the power used, and, of course, any prospecting or signalling operations which are being conducted in the vicinity can be synchronized to take place between the locating signals.

The general assembly generally includes a mechanical source of power, which is the clock spring and the electrical sources of power which are the batteries 8 and 9. By a combination of mechanism and switches, which are incorporated in the electric circuits, it is possible to replenish or renew the mechanical energy for use in controlling the electrical energy for operating the mechanical signals. In other words, there is an interconnection between the electrical and mechanical energies so as to provide a signal device capable of providing constant signals for long periods of time in a self-contained unit.

In some instances a relatively weak signal may be desired and the sound of the clock escapement mechanism might be used.

Figure 8:
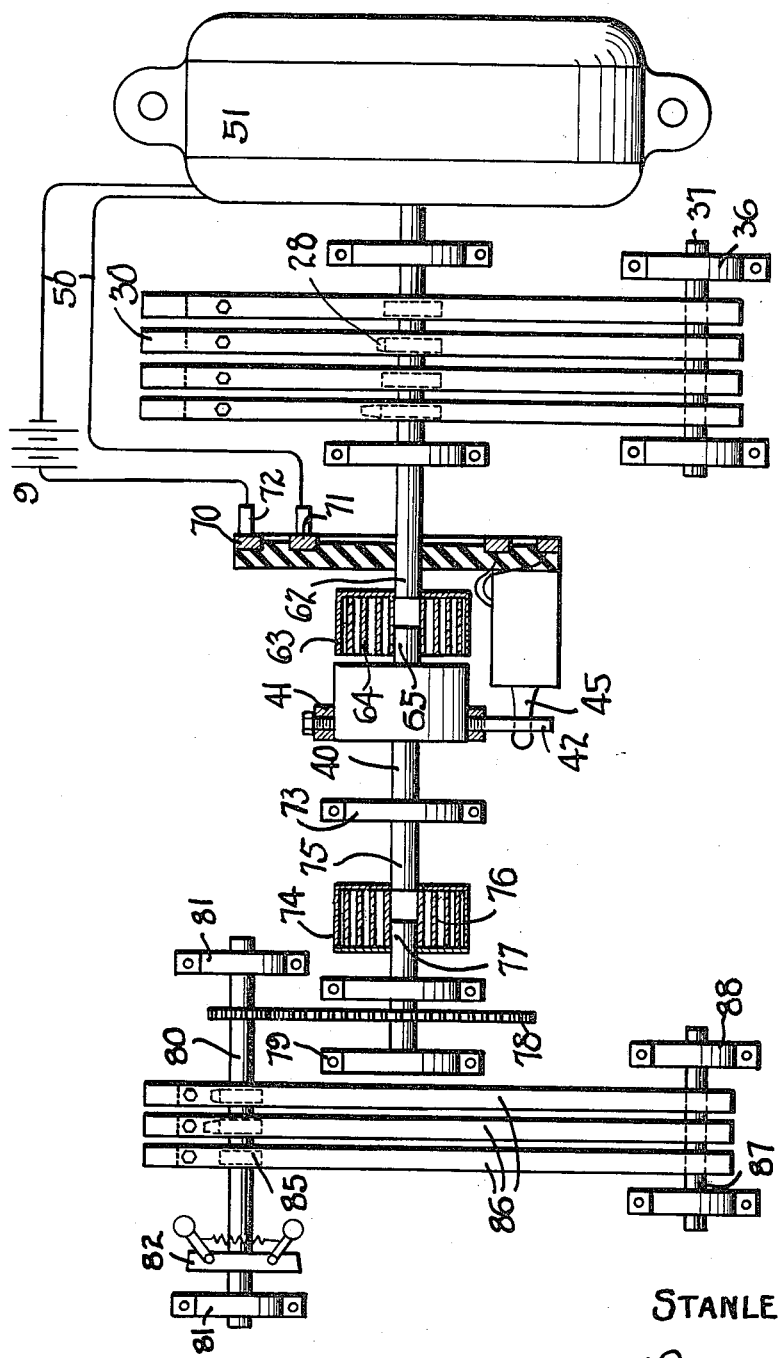
Fig. 8 shows a modified arrangement of the mechanism wherein a single electric motor actuates the signals and rewinds the clock or mechanical source of power.

Fig. 8 of the drawing shows a modified arrangement of the mechanism wherein the clock 15 has been replaced with a suitable timing device, which includes the rewinding mechanism, as described in connection with Fig. 1. This modified arrangement constitutes a combination of the motor shaft 27 and the rewinding mechanism through the shaft 40 of the clock.

In the details of this mechanism, as shown in the right-hand of Fig. 8 where the rewinding spring 64 drives the extension 65, the clock has been omitted and the shaft 40 supported in a bearing 73. A second drum, or barrel, 74 is fixed to the end 75 of the shaft 40 beyond the bearing 73 and carries a coil type rewinding spring 76. This spring is anchored to the barrel 74 at its outer end and to a drive shaft 77 at the other end. This drive shaft is supported in the bearings 79 and carries a gear train 78. Any suitable number or ratio of gears may be provided to drive the stub shaft 80 mounted in the bearings 81.

A governor 82 of the centrifugal type is mounted on the stub shaft 80 to obtain a uniform rotation of the shaft.

The governor 82 may be replaced by a suitable escapement mechanism.

The stub shaft 80 has a plurality of cams 85 thereon which may be of different types or configurations to actuate the plurality of strikers 86 pivoted on a support shaft 87 in bearings 88.

With this arrangement the switch 45 controls the circuits and the switch 21 may be omitted.

This arrangement constitutes a second set of strikers in addition to the strikers 30, of Fig. 1, which are illustrated in the right hand side of Fig. 8.

The advantage of the strikers 86 is to provide a continuous signal because the strikers will be continuously operated by the driving spring 76, which is in turn driven by the spring 64.

The governor 82 controls the rate at which the spring 76 and in turn spring 64 are unwound.

With the foregoing arrangement the strikers 30 will operate intermittently by direct drive from the motor 51, while on the other hand the strikers 86 will operate continually because when the motor winds up the spring 64 and the motor is shut off, the spring 64 continues to drive the shaft 75, which in turn continues to rotate the drive shaft 77 until the resistance of the spring 76 is reduced to such an extent by the torque from the spring 64 that the pins 42 will again turn on the switch 45 and the motor 51.

In this arrangement, therefore, the power from the battery source 9 to the motor 51 will be used at short and periodic intervals and the strikers will actually operate only when the motor is running. The mechanism serves to rewind both the springs 64 and 77 so that the combination thereof will keep the strikers 86 operating continually at a constant rate.

This application relates to the same general subject matter as my prior co-pending applications, Serial Number 36,552, refiled as this application, filed July 1, 1948, for a Marine Marker, and Serial Number 46,807 filed August 3, 1948, now Patent No. 2,594,702 dated April 29, 1952, for a Retrievable Marine Marker.

Broadly, the invention contemplates a self-contained unit marine marker which can be deposited upon water covered areas and then relocated by detecting the signals which are discharged therefrom.

What is claimed is:

1. A marine marker, comprising; a submerged housing, a signal generator mounted in said housing and including a mechanical signal striker, an electric motor driving said striker, an electric circuit connecting said electric motor to a power source, a normally open switch means in said circuit, a switch-closing element constructed and arranged to close said switch means at pre-determined intervals, a spring motor drivingly connected to said switch-closing means, and re-winding means connected to said spring motor including a second spring motor drivingly connected to the first-named spring motor to be unwound by unwinding of the latter and to re-wind said first-named spring motor, a second electric motor drivingly connected to said second spring motor to rewind the latter, a second circuit connecting said second electric motor to a power source, a second switch means in said second circuit, and switch-actuating means driven by said first-named spring motor and arranged to open and close said second switch means at pre-determined wound and unwound positions of said first-named spring motor.

2. A marine marker, comprising, a submerged housing, a signal generator mounted in said housing including a mechanical signal striker, an electric motor driving said striker, an electric circuit connecting said electric motor to a power source, a normally open switch means in said circuit, a switch-closing element constructed and arranged to close said switch means at pre-determined intervals, a spring motor drivingly connected to said switch-closing means, and re-winding means connected to said spring motor including a shaft reversibly driven by the winding and unwinding of said spring motor, a plate member mounted on said shaft for rotation therewith, a second spring motor positioned on said plate and connected to said shaft to be unwound by unwinding of the first-named spring motor and to re-wind the latter, a second electric motor drivingly connected to said second spring motor to re-wind the latter, a second circuit connecting said second electric motor to a power source, a second switch means in said second circuit, and switch actuating means mounted on said plate member positioned to open and close said second switch means at pre-determined angular positions of said plate member.

References Cited in the file of this patent

UNITED STATES PATENTS

| | | |
|---|---|---|
| 510,758 | Adams | Dec. 12, 1893 |
| 989,250 | Gray | Apr. 11, 1911 |
| 1,292,755 | Geraghty | Jan. 28, 1919 |
| 1,466,284 | Harlow | Aug. 28, 1923 |
| 1,610,779 | Hewett | Dec. 14, 1926 |
| 1,689,574 | Williams | Oct. 30, 1928 |
| 1,785,940 | Ennes | Dec. 23, 1930 |
| 1,912,368 | Holinger | June 6, 1933 |
| 2,323,064 | Lustfield | Jan. 29, 1943 |
| 2,473,050 | Camp | June 14, 1949 |

FOREIGN PATENTS

| | | |
|---|---|---|
| 547,485 | France | Sept. 23, 1922 |
| 174,354 | Great Britain | July 19, 1923 |